Patented Apr. 20, 1948

2,439,798

UNITED STATES PATENT OFFICE 2,439,798

MONOAZO COMPOUNDS CONTAINING A PYRAZOLONE NUCLEUS

Joseph B. Dickey and John R. Byers, Jr., Rochester, N. Y., and James G. McNally, Oak Ridge, Tenn., assignors to Eastman Kodak Company, Rochester, N. Y., a corporation of New Jersey No Drawing. Application January 21, 1944, Serial No. 519,192

1 Claim. (Cl. 260—163)

This invention relates to monoazo compounds containing a pyrazolone nucleus and to a process for preparing them.

A number of acid dyes which are monoazo compounds containing a pyrazolone nucleus have been known for many years and have been used to dye wool or to prepare color lakes. It has also been proposed to dye cellulose ester rayon with nonsulfonated monoazo compounds containing a pyrazolone nucleus of the following formula:

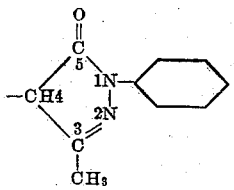

Such monoazo compounds, however, dye cellulose ester rayon only at low rates of speed at the ordinary dyeing temperatures. Subsequently, it was proposed to dye cellulose ester rayon with monoazo dyes containing a pyrazolone nucleus of the following formula:

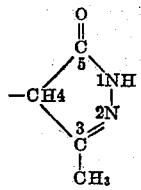

However, such pyrazolone dyes have low tinctorial power, but are useful for tinting cellulose ester rayon. Disazo compounds containing a pyrazolone nucleus of the following formula:

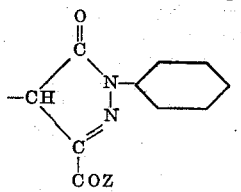

wherein Z represents hydroxyl, amino or alkoxyl, have been developed on cellulose ester rayon by applying an aminoazo compound to the rayon, diazotizing and coupling on the rayon with a pyrazolone corresponding to the nucleus formulated immediately above. Monoazo compounds containing a pyrazolone nucleus of the following formula:

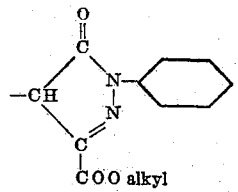

have been found to be very stable to light and to be suitable for the coloring of cellulose ester lacquers. Such monoazo compounds, however, dye cellulose ester rayon only at low rates of speed at the ordinary dyeing temperatures and are, therefore, impractical as cellulose ester rayon dyes.

We have now found a kind of non-acid monoazo compound which has not only very good fastness to light, but also can be employed to dye cellulose ester rayon and fabrics made therefrom, since the compounds color cellulose ester rayon at a practical rate of speed at low temperatures (60 to 65° C.) and have a high tinctorial power for the rayon.

It is, accordingly, an object of our invention to provide new monoazo compounds and to provide a process for the preparation thereof. Another object is to provide cellulose ester rayon colored with such compounds. Other objects will become apparent hereinafter.

The compounds of our invention can be represented by the following general formula:

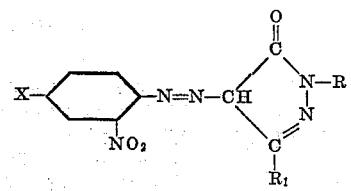

wherein R represents a member selected from the group consisting of hydrogen and low carbon aliphatic alcohol radicals, $R_1$ represents a member selected from the group consisting of carboxyl groups which are esterified with a low carbon aliphatic alcohol, a carbamyl group, a carbamyl group in which one hydrogen is replaced by a low carbon aliphatic alcohol radical and a carbamyl group in which each hydrogen atom is replaced by a low carbon aliphatic alcohol radical, X represents a member selected from the group consisting of hydrogen, a low carbon aliphatic alcohol radical, an aliphatic ether radical, a halogen atom, a trifluoromethyl group, a cyano group, an aliphatic acyl group, a carboxyl group esterified with a low carbon aliphatic alcohol, a carbamyl group, a carbamyl group in which one hydrogen is replaced by a low carbon aliphatic alcohol radical, a carbamyl group in which each hydrogen atom is replaced by a low carbon aliphatic alcohol radical, a sulfamyl radical, a sulfamyl radical in which one hydrogen is replaced by a low carbon aliphatic alcohol radical and a sulfamyl group in which each hydrogen is replaced by a low carbon aliphatic alcohol radical.

To prepare one of our new compounds, we diazotize an appropriate monocyclic amine of the benzene series and couple the resulting diazonium salt with the appropriate pyrazolone derivative. The appropriate monocyclic primary amines of the benzene series can be represented by the following formula:

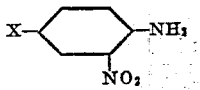

wherein X has the value set forth above. The appropriate pyrazolone derivatives can be formulated as follows:

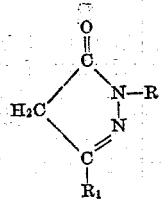

wherein R and $R_1$ have the values set forth above.

The following examples will serve to illustrate our new monoazo compounds and the manner of obtaining the same.

*Example 1.—4-(4-chloro-2-nitrophenylazo)-3-carbethoxy-5-pyrazolone*

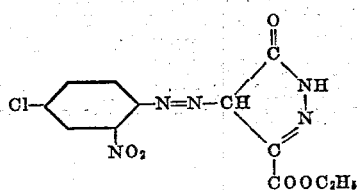

172.5 g. (1 mole) of o-nitro-p-chloraniline (finely powdered) and 1000 cc. of water were vigorously stirred with 0.5 g. of sodium sulfate of technical oleyl alcohol, at 80° C. To this well stirred mixture were added 170 g. of sulfuric acid (sp. g. 1.84) in 200 cc. of water, over a period of 10 minutes. The resulting mixture was cooled and 1 kg. of crushed ice was added. Immediately upon the addition of the ice, there was added a solution containing 76 g. of sodium nitrite in 200 cc. of water. Diazotization was complete in about 15 minutes. Excess nitrous acid was destroyed by adding sulfamic acid.

156 g. (1 mole) of 3-carbethoxy-5-pyrazolone were warmed in 500 cc. of acetic acid, and 1 kg. of crushed ice was added with vigorous stirring. The diazo solution, prepared as described above, was then added. Coupling was completed by neutralizing the mineral acid with sodium bicarbonate. The azo dye was filtered off, washed with water and dried. The dye colored cellulose acetate rayon yarn, as well as nylon yarn, greenish yellow shades from an aqueous suspension of the dye. The dye melted at 228° to 231° C.

In place of o-nitro-p-chloraniline, a molecularly equivalent amount of o-nitraniline, 2-nitro-4-methylaniline, 2-nitro-4-methoxyaniline, 2-nitro-4-ethoxyaniline, 2-nitro-4-bromaniline, 2-nitro-4-fluoroaniline or 2-nitro-4-cyanoaniline can be used. Likewise other 3-carbalkoxy-5-pyrazolones, or 3-carbamyl-5-pyrazolones, can be used.

*Example 2.—4-[4-(n-butylsulfamyl)-2-nitrophenylazo]-3-carbethoxy-5-pyrazolone*

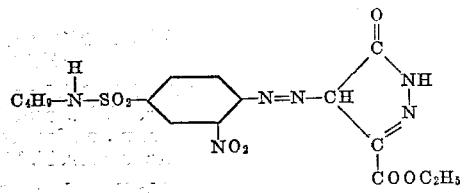

900 cc. of nitric acid (65%–70%) in a 2-liter flask were cooled, with stirring, to 10° to 12° C. Then 75 g. of sodium nitrite were added rapidly in such a manner that the stirrer carried the crystals immediately under the surface. Stirring was continued for about 15 minutes, permitting the temperature to rise to 15° to 16° C. The resulting nitrosylnitric acid solution was cooled to 8° C. and 273 g. (1 mole) of 4-amino-3-nitro-N-n-butyl benzenesulfonamide were added portionwise to the well-stirred solution over a period of 30 minutes, keeping the temperature between 8° and 11° C. Stirring was continued at 11° C. for ½ hour, and then 5 to 10 g. of sodium nitrite were added rapidly as above. Then 100 g. of crushed ice were slowly added. The diazo solution thus prepared was added slowly with stirring to a well-iced aqueous suspension of 156 g. (1 mole) of 3-carbethoxy-5-pyrazolone prepared by dissolving the carbethoxy derivative in 1000 cc. of acetic acid and pouring the solution into two liters of ice water with vigorous stirring. Coupling was completed by adding sodium bicarbonate. The azo dye was filtered off, washed and dried it melted at 230° to 235° C. The dye colored cellulose acetate rayon yarn, as well as nylon yarn, greenish yellow shades.

In a manner similar to that illustrated in the foregoing examples, the following dyes were prepared:

| | M. P., °C. |
|---|---|
| 4 - (4 - chloro - 2 - nitrophenylazo) - 3 - carbamyl - 5 - pyrazolone | 218–220 |
| 4 - (4 - chloro - 2 - nitrophenylazo) - 3 - carbomethoxy - 5 - pyrazolone | 225–230 |
| 4 - (2 - nitrophenylazo) - 3 - carbethoxy - 5 - pyrazolone | 250–253 |
| 4 - (4 - trifluoromethyl - 2 - nitrophenylazo) - 3 - carbethoxy - 5 - pyrazolone | 185–190 |
| 4 - (4 - carbethoxy - 2 - nitrophenylazo) - 3 - carbethoxy - 5 - pyrazolone | 205–208 |
| 4 - (4 - acetyl - 2 - nitrophenylazo) - 3 - carbomethoxy - 5 - pyrazolone | 254–256 |
| 4 - [4 - (n - butyl sulfamyl) - 2 - nitrophenylazo] - 3 - carbomethoxy - 5 - pyrazolone | 230–235 |
| 4 - (4 - β - methoxyethylcarbamyl - 2 - nitrophenylazo) - 3 - carbethoxy 5 pyrazolone | 226–228 |
| 4 - [4 - (β - hydroxyethylcarbamyl) - 2 - nitrophenylazo] - 3 - carbethoxypyrazolone | 154–158 |
| 4 - (4 - ethylsulfamyl - 2 - nitrophenylazo) - 3 - carbethoxy - 5 - pyrazolone | 251–253 |
| 4 - (4 - methoxy - 2 - nitrophenylazo) - 3 - carbethoxy - 5 - pyrazolone | 246–248 |
| 4 - (4 - ethoxy - 2 - nitrophenylazo) - 3 - carbethoxy - 5 - pyrazolone | 237–240 |
| 4 - (4 - ethoxy - 2 - nitrophenylazo) - 3 - carbomethoxy - 5 - pyrazolone | 244–246 |
| 4 - (4 - methoxy - 2 - nitrophenylazo) - 3 - carbomethoxy - 5 - pyrazolone | 243–245 |

The amines used as diazo components in the preparation of our new azo dyes are for the most part known substances and can be prepared by the known processes illustrated in the prior art. The amines containing a sulfamyl group can be prepared as illustrated in the following examples:

*Example 3.—4-amino-3-nitro-N-ethylbenzene-sulfonamide*

1 gram-mole of 4-chloro-3-nitro-N-ethylbenzenesulfonamide and 700 cc. of concentrated ammonia water were heated in a shaking autoclave at 160° C. for 4 hours. When cooled, the contents of the autoclave were removed and the yellow crystals of the sulfonamide were filtered off, washed with water and dried in the air.

The 4-chloro-3-nitro-N-ethylbenzenesulfonamide employed above was prepared as follows: 640 g. (2.51 mole) of 4-chloro-3-nitrobenzenesulfonylchloride were dissolved in 700 cc. of acetone. The resulting solution was cooled to 3° C. To the cooled solution were added 680 g. of a 33 per cent aqueous solution of ethylamine over a period of 2.5 hours, with stirring. Stirring was continued for several hours at 10° to 15° C. The resulting mixture was added to 8 liters of water and ice. The precipitated 4-chloro-3-nitro-N-ethylbenzenesulfonamide was filtered off, washed with water and dried in the air. It melted at 89° to 91° C. In a similar manner, other sulfonyl compounds can be prepared using ammonia, methylamine, n-butylamine, isopropylamine, β-hydroxyethylamine, β-methoxyethylamine, tetrahydrofurfurylamine, dimethylamine, etc.

The 4-chloro-3-nitrobenzenesulfonylchloride employed above was prepared as follows: 245 g. of 4-chloro-3-nitrobenzene sodium sulfonate and 460 g. of chlorosulfonic acid were heated at 135° to 140° C. for 6 hours. When cooled, the mixture was poured into ice water and the sulfonylchloride separated out as a white crystalline compound melting at 101° to 102° C., after filtering, washing with water and drying in the air.

The pyrazolone compounds containing an esterified carboxyl group in the 3-position can be prepared by esterifying a 3-carboxy-5-pyrazolone with an alcohol in the presence of a mineral acid such as hydrogen chloride, in accordance with the method of Rothenburg, Berichte 26, 2053 (1893). Alcohols such as methanol, ethanol, n-propanol, isopropanol, n-butanol, ethylene glycol, diethylene glycol, triethylene glycol, propylene glycol, β-methoxyethanol and diethylene glycol monoethyl ether can be employed, for example. The 3-carboxy-5-pyrazolones are formed by hydrolyzing the corresponding 3-carbethoxy-5-pyrazolones which, in turn, are formed by the interaction of oxalacetic ester with hydrazine or hydrazines in which one of the hydrogens is replaced by an alcohol radical. See Rothenburg, Berichte 25, 3441 (1892), and Berichte 26, 1719 (1893). The 3-carbamyl-5-pyrazolones can be prepared by condensing 3-carbomethoxy-5-pyrazolone with ammonia or primary or secondary aliphatic amines in a sealed tube at 100° to 120° C., in accordance with the process of Rothenburg, J. prakt. Chem. (2) 51, 43 (1895). Methylamine, ethylamine, n-propylamine, isopropylamine, β-methoxyethylamine, β-ethoxymethoxyethylamine, dimethylamine, diethylamine, ethylmethylamine, diethanolamine, β,γ-dihydroxypropylethylamine or ditetrahydrofurfurylamine can be employed, for example.

The new azo compounds of our invention are of greatest utility for the coloration of textile materials comprising organic derivatives of cellulose. However, they may be used for the coloration of non-vegetable textile fibers, in general. Thus, they can be used to color organic derivatives of cellulose, silk, wool, nylon, vinyl acetate-vinyl chloride copolymers, and protein synthetic wools, also cellulose ester and cellulose ether lacquers, as well as lacquers from vinyl compounds can be colored. The coloration produced by our new azo compounds is generally greenish yellow.

Typical organic derivatives of cellulose that can be colored with our new azo compounds include the hydrolyzed, as well as the unhydrolyzed, cellulose carboxylic esters, such as cellulose acetate, cellulose propionate and cellulose butyrate, and the hydrolyzed, as well as the unhydrolyzed, mixed cellulose carboxylic esters, such as cellulose acetate propionate and cellulose acetate butyrate, and the cellulose ethers, such as methyl cellulose, ethyl cellulose and benzyl cellulose.

The azo compounds of our invention are for the most part relatively insoluble in water and, accordingly, they may be advantageously directly applied to the textile material undergoing coloration in the form of an aqueous suspension which can be prepared by grinding the dye to a paste, in the presence of a sulfonated oil soap, or other suitable dispersing agent and dispersing the resulting paste in water. In some instances the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus the textile material to be dyed or colored is ordinarily added to the dyebath at a temperature lower than that at which the main portion of the dyeing is to be effected, e. g., a temperature of from 45° to 55° C. Following this the temperature is raised to that selected for carrying out the operation. The temperature at which the process is continued may vary somewhat, depending upon the particular material undergoing coloration. As understood by those skilled in the art, the intensity of dyeing can be varied by varying the proportion of dye to the material undergoing preparation. Generally speaking, 1 to 3 per cent by weight of the dye to material is employed, although any desired proportions can be used.

Suitable dispersing agents are disclosed in U. S. Patent 2,115,030, issuing April 26, 1938. The process disclosed in the aforesaid patent for the dyeing of cellulose acetate can be used in applying the dyes in the present invention to cellulose acetate. While a satisfactory method for dyeing has been disclosed herein, it will be understood that any other suitable methods for dyeing the non-vegetable textile materials named herein can be employed. Lacquers may be colored with the dye compounds of our invention by the methods customarily employed in the lacquer art.

The term nylon is intended to describe a linear polyamide resin such as set forth in United State Patent 2,071,250, dated February 16, 1937. The term aliphatic alcohol radical is intended to mean any radical derivable from an aliphatic alcohol by dropping the OH group, e. g., ethyl from ethyl alcohol, allyl from allyl alcohol, tertiary butyl from tertiary butyl alcohol, etc.

What we claim as our invention and desire to be secured by Letters Patent of the United States is:

4-(4-n-butylsulfamyl-2-nitrophenylazo)-3-carbethoxy-5-pyrazolone.

JOSEPH B. DICKEY.
JOHN R. BYERS, Jr.
JAMES G. McNALLY.

REFERENCES CITED

The following references are of record in the file of this patent:

UNITED STATES PATENTS

| Number | Name | Date |
|---|---|---|
| 1,791,432 | Schmid et al. | Feb. 3, 1931 |
| 1,828,599 | Montmollin et al. | Oct. 20, 1931 |

FOREIGN PATENTS

| Number | Country | Date |
|---|---|---|
| 516,929 | Great Britain | Jan. 16, 1940 |
| 814,422 | France | Mar. 15, 1937 |
| 659,267 | France | Feb. 4, 1929 |
| 532,079 | Germany | Aug. 20, 1931 |